April 29, 1952    O. H. LUTHER    2,594,466
INTERMITTENT FILM FEEDING MECHANISM
UTILIZING SCROLL GEARS
Filed March 15, 1949    4 Sheets-Sheet 2
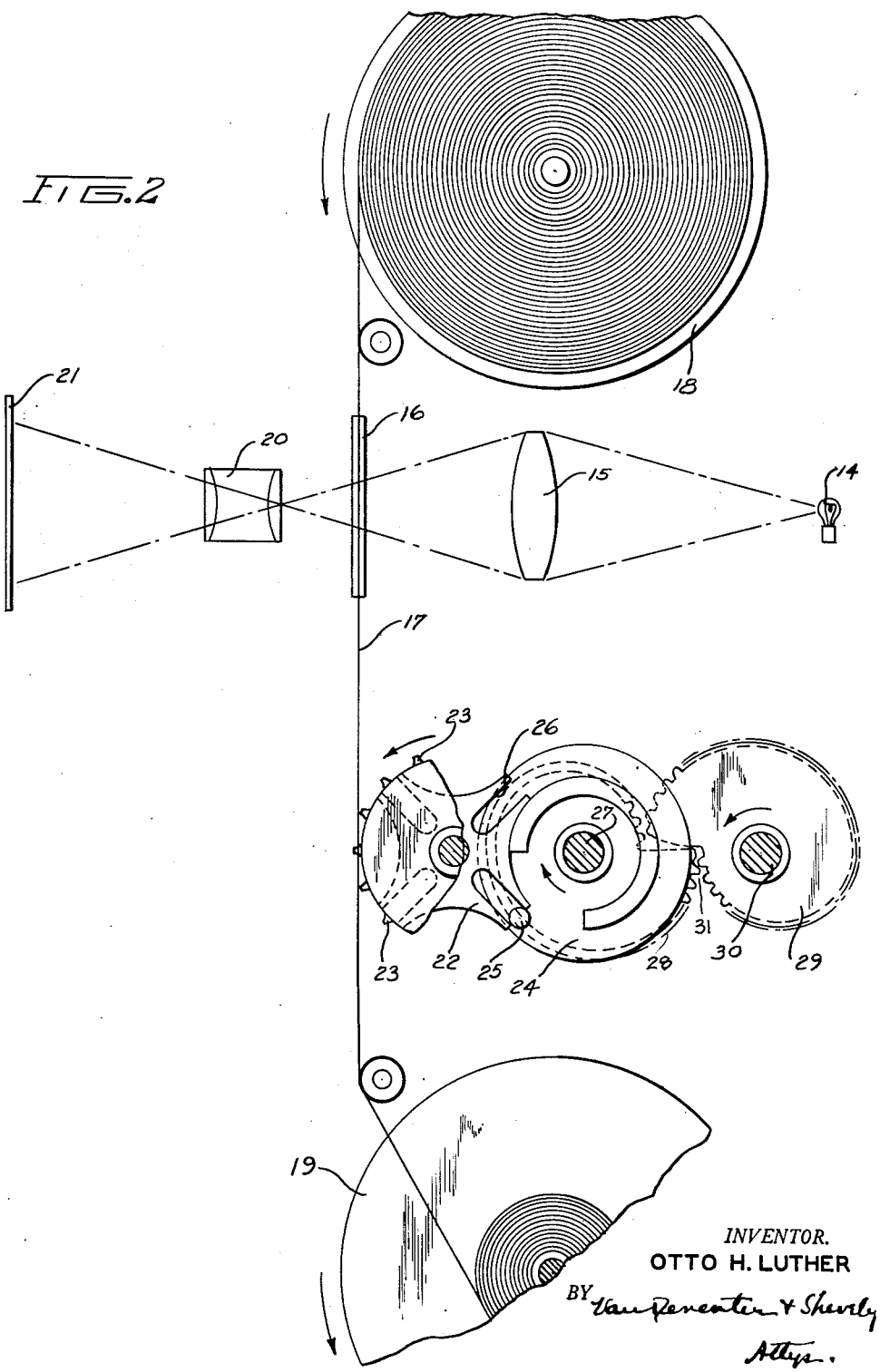
INVENTOR.
OTTO H. LUTHER April 29, 1952     O. H. LUTHER     2,594,466
INTERMITTENT FILM FEEDING MECHANISM
UTILIZING SCROLL GEARS
Filed March 15, 1949     4 Sheets-Sheet 3

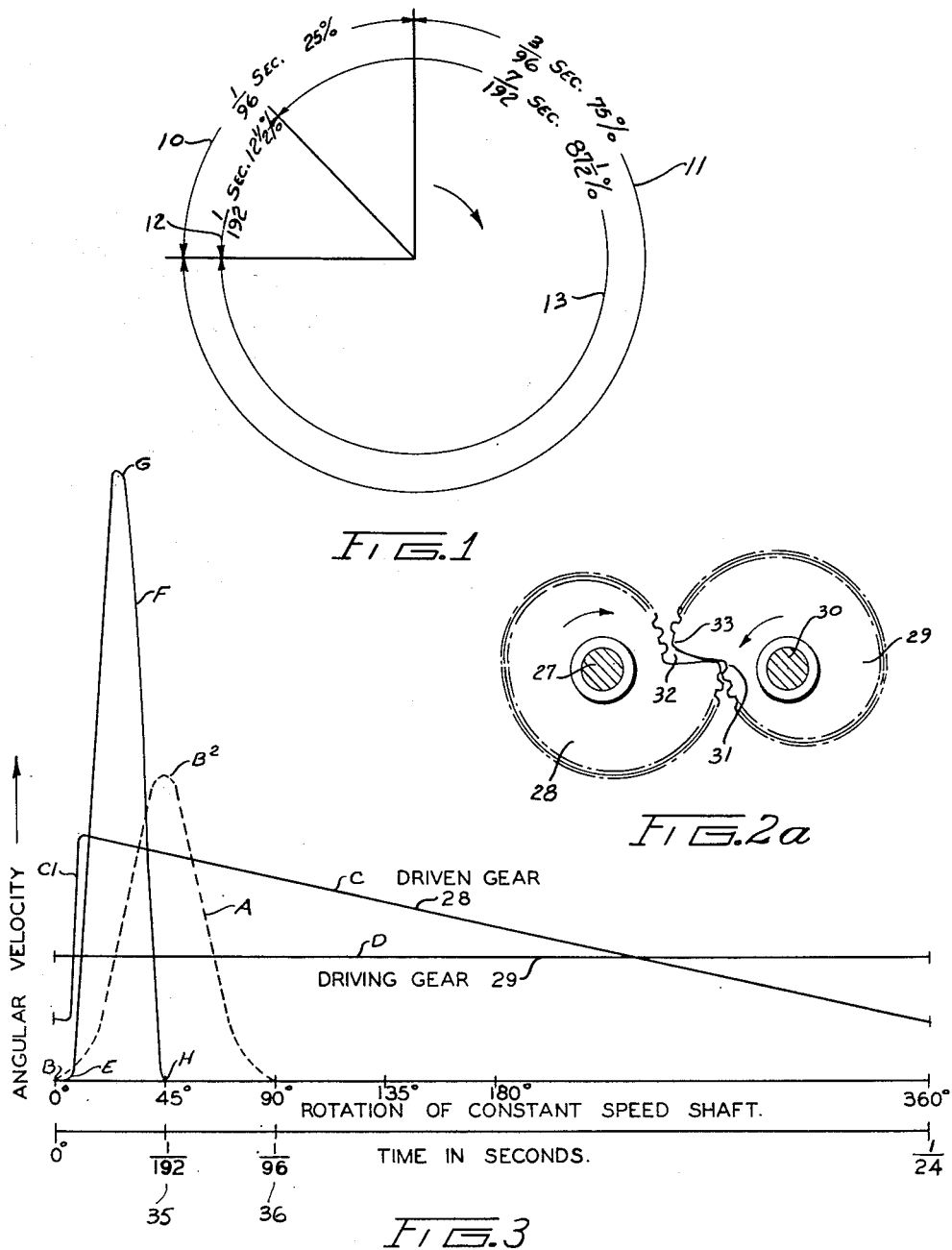

*INVENTOR.*
OTTO H. LUTHER

April 29, 1952
O. H. LUTHER
2,594,466
INTERMITTENT FILM FEEDING MECHANISM
UTILIZING SCROLL GEARS
Filed March 15, 1949
4 Sheets-Sheet 4
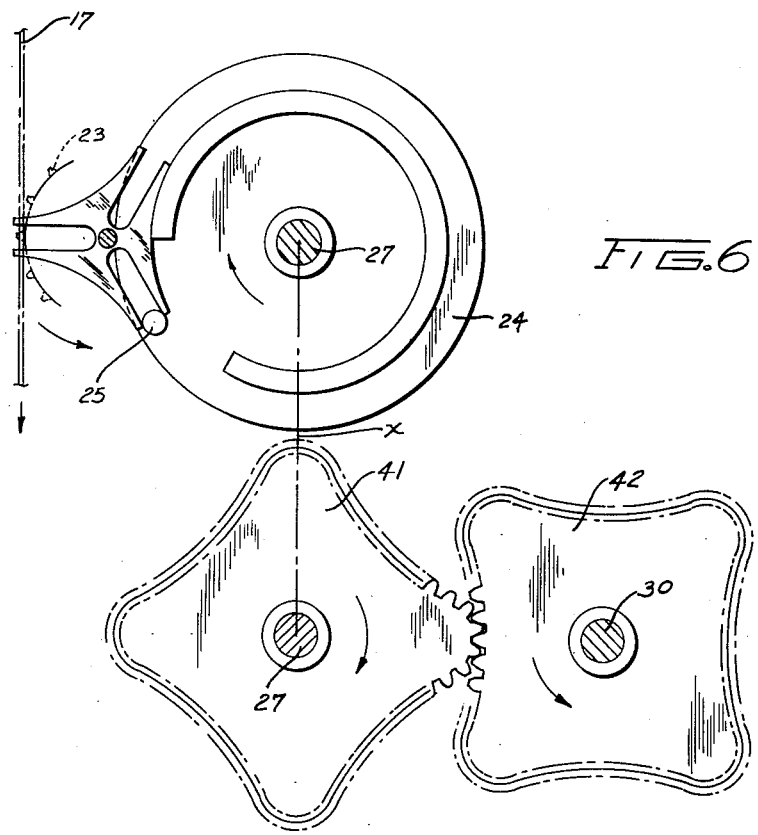
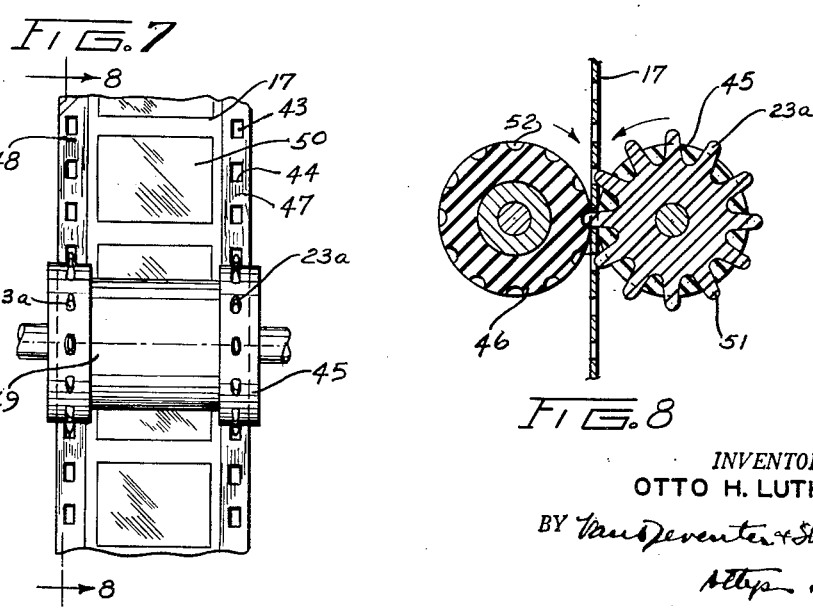
INVENTOR.
OTTO H. LUTHER Patented Apr. 29, 1952

2,594,466

UNITED STATES PATENT OFFICE 2,594,466

INTERMITTENT FILM FEEDING MECHANISM UTILIZING SCROLL GEARS

Otto H. Luther, New York, N. Y.

Application March 15, 1949, Serial No. 81,575

5 Claims. (Cl. 88—18.3)

This invention relates to a mechanism for moving film and more particularly for moving film in a motion picture projector.

An object of the invention is to provide a mechanism of the class described that will increase the motionless time the picture is displayed from the present 75% of the total time to 87½% or more with a consequent brightening of the image without the additional illumination otherwise necessary to obtain the same result.

Another object is to eliminate "flicker" by shortening the time the film is in motion. This time while the film is moving is commonly termed "pull-down."

Another object is to provide a mechanism that will reduce wear on the film while moving the same at increased speed as compared to known film moving mechanisms.

Another object is to eliminate the use of 30-frame-per-second and other high speed projection devices many of which not only require special film moving equipment, but also require special film.

A further object is to attain the foregoing objects without changing the present motion picture projection speed or frame cycle of 24 frames per second.

A still further object is to provide an improved projector for use with televised motion pictures where 60 television frames per second are employed.

Another object is to provide an improved driving sprocket arrangement for film which increases the area of contact between the film and its driving mechanism, thereby lessening tearing of the film at the sprocket holes which often occurs with known film drives, especially where high speed pull-down is employed.

Other projects and advantages will be apparent from the following specification and the accompanying drawings wherein by way of illustration a preferred embodiment of the invention is described. It will be understood, however, that this disclosure is merely illustrative and not limitative, as many changes in the construction and arrangement of the apparatus herein described can be made without departing from the appended claims which define the invention.

In the accompanying drawings:

Figure 1 is a diagram illustrating the complete frame cycle of a motion picture projector illustrating the standard known practice and that disclosed in the present invention;

Figure 2 is a diagram illustrating a motion picture projector embodying the invention;

Figure 2a is a view of the scroll gears shown in Fig. 2;

Figure 3 is a diagram hereinafter referred to in connection with the description of the apparatus as shown in the other figures;

Figure 6 is a diagram of an alternate form of construction of a motion picture projector embodying the invention;

Figure 7 is an illustration of an improved form of sprocket wheel which may be used with the invention; and Figure 8 is a view partly in section on the line 8—8 of Figure 7.

Figure 4:
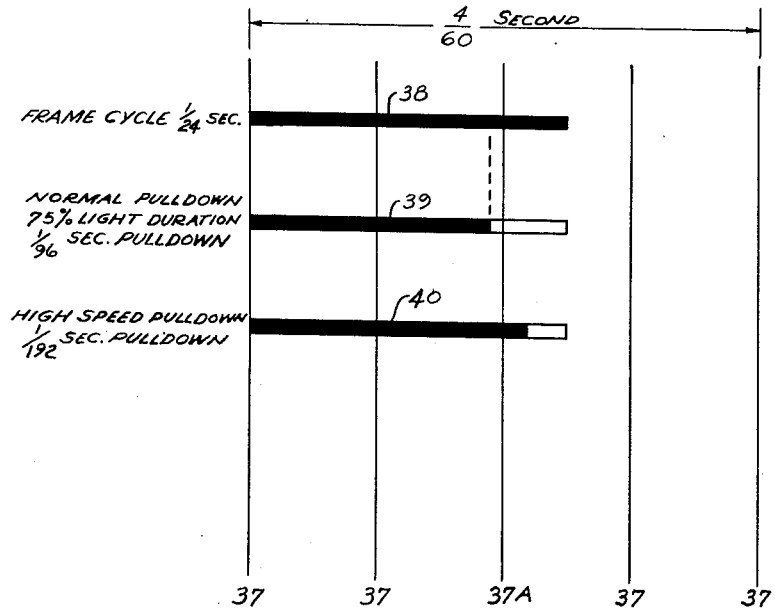
Figure 4 is a diagram of the operation of the projector embodying the invention when applied to television.

Figure 1 shows the cycle time of one form of a motion picture projector. This repetitive time cycle occurs in 1/24 second. During this time the film in an ordinary projector is moving during pull-down as indicated at 10, and the screen is dark for 25% of the time. Between pull-downs, the film is stationary and the picture is projected to the screen for 75% of the cycle time as indicated at 11. This is standard practice.

By the present invention the pull-down time is reduced to 12½% of the cycle time as indicated at 12 and the projection time is increased to 87½% of the cycle time as indicated at 13.

The number of frames per second remains at 24 in both cases.

A lengthened time of projection beyond 75% has heretofore been attained by merely carrying out the pull-down motion at high speed but the mechanisms heretofore employed for this purpose shortens the life of the film by tearing the sprocket holes therein; rapid wear of the film feeding mechanism occurs.

One of the main objects of the instant invention is to accomplish this shortened pull-down with a consequent shortening of the dark period without danger to the film and without causing excessive wear of the mechanism. This is accomplished by starting the pull-down operation at comparatively slow speed, rapidly increasing same to a maximum and completing the operation at a lesser speed than said maximum. By this means the static inertia and friction of the film and mechanism is gently overcome at starting of the pull-down operation.

The foregoing object is accomplished by introducing suitable gearing between a part of the projector having uniform rotary motion and the Geneva drive thereof. (Such drives have a part commonly called a Maltese cross, star wheel or spider.) Slow starting, quick acceleration and slow stopping of the film feed mechanism may be attained and suitable gearing for this purpose is shown in Figures 2, 2A and 6.

Referring to Figure 2, the numeral 14 denotes a light source, 15 the condenser, 16 the film gate, 17 the film unwound off the reel 18 to reel 19, 20 the lens and 21 the projection surface to which images on the film are projected.

The numeral 22 denotes the star wheel of the Geneva motion having the usual sprocket with teeth 23 engaging sprocket holes or perforations in the film. The wheel 24 of the Geneva drive mechanism has the usual pin 25 which, as the wheel revolves, enters successively each of the slots 26 in the star wheel 22 turning same through a ¼ revolution as the pin traverses each slot. This causes the teeth 23 to pull down film 17 a sufficient distance to display one frame.

All these parts are of any suitable design and as their construction and operation is well known, they will not be described herein in detail.

Heretofore it has been the practice to drive the wheel 24 at a constant speed by a motor geared to shaft 27 to drive the Geneva motion. The result is that the angular velocity of the star wheel 22 (and the consequent speed of the film) is as shown by curve A, Fig. 3. From this curve it will be observed that the pin 25 of the Geneva motion engages slots 26 at the point B on the curve and accelerates and decelerates wheel 22 to accomplish pull-down in 1/96 second.

Now to practice the instant invention the shaft 27 may be stationary and form a bearing for wheel 24 to which is secured a driven scroll gear 28, the angular velocity of which is shown by curve C in Fig. 3.

Gear 28 is meshed with a scroll gear driver 29 and the angular velocity of this driving gear is shown at D in Fig. 3. It will be noted that 29 is driven at uniform speed by a motor (not shown) geared to shaft 30.

The star wheel 22, pin 25 and gears 28 and 29 are so related that when the pin 25 is just entering one of the slots 26 (which would be at point E on curve F, Fig. 3), the teeth of gears 28 and 29 are about to end their engagement at 31, Figs. 2 and 2A.

At this point the speed of gear 28 is approaching a minimum and therefore the acceleration of star wheel 22 by pin 25 is less at this point than when prior methods of operating the star wheel are employed, for example when the star wheel is operated at a constant speed as previously described.

Also as pin 25 is driving wheel 22 at its outermost point, at this instant the teeth 23 engage film 17 at their slowest rate of movement, which is slower than with known methods. Gear 28 at this instant is revolving at about half the speed of the driving gear 29.

When the teeth of gears 28, 29 engage at points 32 33, the speed of gear 28 is greatly accelerated and it attains approximately twice the angular velocity of gear 29. This is shown by the substantially vertical part C1 of the curve C in Fig. 3, and this sudden acceleration causes a corresponding increase in the speed of pin 25 as it moves inwardly in one of the slots 26. The speed of the star wheel 22 is correspondingly increased, causing the pull-down to occur at greatly increased speed as compared with known methods. As the film is already moving when this increased speed is attained, there is no sudden jerk or strain on it as occurs with known methods, and the increased speed at this time is therefore not detrimental.

As the gears 28, 29 revolve, the speed of 28 decreases throughout the remainder of its revolution to point 31 where its speed is less than that of gear 29.

From a study of the figures it will be evident that the film starts to move gently when the gears are meshed at point 31 (point E, Fig. 3) and rapidly increases in speed to point G and, as the gears mesh at 32, 33 the speed decreases until point H on curve F is reached. Thus the gear action plus the action of the Geneva motion operated thereby enables the film to be moved linearly as far in 1/192 of a second as in 1/96 second by known methods, with gear 29 driving at uniform speed, and the actual starting of the film and mechanism is more gradual than can be attained by known means.

The foregoing will be clearly apparent from Fig. 3 where the time in seconds at 35 is shown for the composite action of the Geneva motion plus gears, and the time in seconds is shown at 36 for the Geneva motion when driven directly at uniform speed which is present known practice.

From curve A in Fig. 3, it will be seen that the Geneva motion alone can only produce the motion indicated by curve A for every ¼ revolution (90°) of its constant speed driver and that the greatest increase in speed obtainable in this time would be that from the starting point B to the point B2. However, by superimposing the movement of the Geneva mechanism on to that obtained by the gears, the necessary speed to accomplish the desired decrease in the time of the pull-down from 1/96 second to 1/196 second is obtained as shown at F.

Turning now to Fig. 4, the advantages of this invention to televised motion pictures will be described.

In this figure the evenly spaced vertical lines 37 denotes electronic flashes at the rate of 60 per second, which furnishes light for the projection instead of lamp 14. Three of these flashes occur during each frame cycle 38 of the ordinary motion picture projector, this cycle being that shown in Fig. 1.

If the normal pull-down of 1/96 second is used, only two flashes per frame can be utilized with prior art devices. This will be apparent from a study of Fig. 4, where the normal pull-down is indicated at 39 and where, beginning at the left, three flashes are shown. It will be seen that the right hand one of these three flashes marked 37a misses the stationary portion of the frame cycle.

Figure 5:
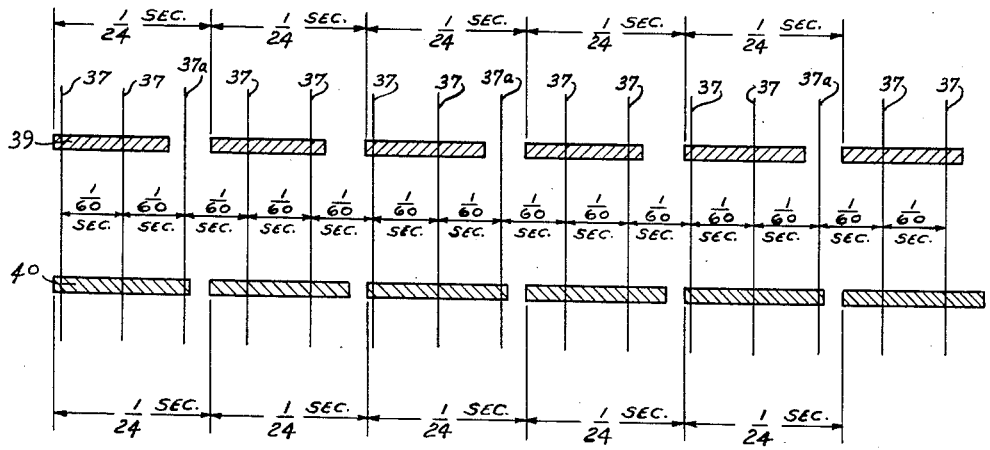
Figure 5 is a diagram used in connection with the following description of the invention as applied to television.

The improved pull-down herein described is referred to in Fig. 4 as "high speed pull-down" and is indicated at 40. It will be seen that this provides ample time for 3 flashes beginning from the left of the figure and makes it possible to use first 2 flashes and then 3 flashes alternately as shown at 49 in Fig. 5. This invention therefore permits more light to be obtained with a resultant brighter image than can be obtained by known means.

Figure 6 shows an alternate form of gearing that can be interposed between the driving gear and the Geneva motion to practice this invention. Here the star wheel 22 is the same as that shown in Fig. 2 and is driven by the wheel 24 which is driven by the gear 41 meshed with the driving gear 42, the latter being driven at constant speed via shaft 30. For the sake of clarity gear 41 is shown below wheel 24 but it will be understood these are connected as shown at X.

These gears are often called square gears and the operation of the device in Fig. 6 is much the same as the operation of the device shown in Fig. 2.

Slow engagement, quick acceleration and slow deceleration of the Geneva motion is secured and, while the resultant curve is somewhat different in contour from curve F in Fig. 3, the desirable results previously mentioned are attained.

Details of the design and construction of the scroll, square and any other gears employed herein are not given as these would depend on the design of other parts of the projector in which the gears are used and the construction of such gears is well known. Once the inventive concept herein disclosed is understood, any suitable type of gearing can be devised and it is obvious that the invention can be used with claw motions and the like instead of rotary sprockets and that the same is applicable to imperforate film where the feeding mechanism comprises a pair of wheels which grip the film and move it through the pull-down period.

As the modification of the invention to apply it to such drives is obvious to those skilled in the art, no detailed description of them is given herein.

As a further aid to prevent tearing of the film, the feed roller construction shown in Figs. 7 and 8 may be employed. While it is preferable to use this with the gearing shown in Figs. 2 and 6, these feed rollers alone are advantageous and may be used with existing film feeding mechanisms to advantage.

Referring to Fig. 7, the film 17 has the usual sprocket holes 43 therein. With known sprocket drive wheels such as shown at 22, Fig. 2, the teeth 23 engage the lower edges 44 of these holes and as this edge is only the thickness of the film, the entire driving strain during pull-down is applied only to a small area of the film, and tearing and rapid wear occurs.

By providing a sprocket wheel 45 (this can be the wheel with teeth 23, Fig. 2) of rubber or the like having metallic teeth 23A embedded therein, and opposing thereto a second roller 46 which may also have a resilient face of rubber or the like, the film 17 lying between said rollers is gripped thereby during pull-down over the enlarged strip-like areas as shown by the shading 47, 48, and by this means the strain incident to the pull-down operation is more evenly distributed throughout a larger area of the film.

The rollers are cut away as indicated at 49 to avoid touching the picture area 50. While each tooth 23A may be separately embedded in the roller 45 as previously mentioned, these teeth may form part of a solid core 51 from which the teeth project, said core being surrounded by rubber which engages the film at the root of the teeth as shown.

Roller 46 has indentations or pockets 52 therein to receive the apexes of the teeth 23A and rollers 45 and 46 are pressed slightly together to grip the film 17 therebetween and are properly driven in unison by suitable means (not shown).

The teeth prevent slippage of the film between the rubber faced rollers and the rubber faces increase the area of contact between the film and the rollers and distribute the driving strain as aforesaid. They also distribute the strain on the film when starting.

While the rollers 45 and 46 have been described as having resilient faces where they engage the film, it has been found that these rollers may be solid rollers of any material, resilient or non-resilient, that will engage the film as previously described.

In the case of non-resilient rollers, the rollers may be pressed together by any suitable means, such for example as a spring (not shown) urging roller 46 toward roller 45 with the film gripped between the rollers as previously described.

What is claimed is:

1. In apparatus of the class described, a driving shaft having uniform angular velocity, a scroll gear on said shaft, film feeding mechanism including a first rotary means adapted to move film and a second means adapted to intermittently engage and move said first means from rest to a maximum sped and return same to rest during each period of engagement, and a second scroll gear driven by said first gear and connected to said second means to continuously rotate same, said gears being meshed together with the largest radius of said first gear meshed with the smallest radius of said second gear so as to operate cyclically in less than one-half revolution of said driving shaft to cause said first and second means of said film feeding mechanism to engage when said second gear and the second means of said mechanism are moving at an angular velocity less than the angular velocity of said first gear, said second rotary means engaging said first rotary means to impart thereto a movement which is first lessened after engagement and then increased to maximum while said first and second rotary means are in engagement.

2. The combination as claimed in claim 1 wherein the said first rotary means includes the slotted star wheel of a Geneva motion and said second means includes the pin thereof.

3. The combination as claimed in claim 1 wherein the said first rotary means includes the slotted star wheel of a Geneva motion and said second means includes the pin thereof and said gears produce a variable speed ratio during each revolution of from 2 revolutions of the driver to 1 revolution of the driven, to 1 revolution of the driver to 2 revolutions of the driven.

4. In an apparatus of the class described including a Geneva motion for intermittently moving film during pull-down, a shaft for driving said Geneva motion having a constant angular velocity, and means including a pair of scroll gears meshed together with the largest radius of one gear meshed with the smallest radius of the other and also adapted to operate in less than one-half revolution of said shaft including a member interposed between said shaft and said Geneva motion whereby the latter is engaged for movement by said member when the latter is moving at an angular velocity less than that of said shaft to cause said Geneva motion to move through its cycle at an angular velocity at least approximately twice that of said shaft and return to starting position during approximately one eighth of a revolution of said shaft, said member engaging said Geneva motion to impart thereto a movement which is first lessened after engagement and then increased to maximum while said member and Geneva motion are in engagement.

5. In a projector, a driving shaft having the usual speed of 24 R. P. M., a Geneva motion having a driving and driven part which intermittently engage, gearing interposed between said Geneva motion and said shaft whereby the resultant pull-down is accomplished in approximately ⅛ revolution of said shaft, said Geneva motion starting at a speed less than that of said shaft and said gearing causing the operation of said Geneva motion during part of each pull-down at a speed of at least approximately twice the speed of said shaft, said gearing including a pair of cooperating scroll gears meshed together with the largest radius of one gear meshed with the smallest radius of the other gear driven by said shaft, said second scroll gear being driven by said first scroll gear having a cycle of revolution beginning at a speed approximately less than that of said shaft, exceeding approximately twice the speed of said shaft and returning to a speed approximately less than that of said shaft in $\frac{1}{24}$ second said highest and lowest speeds of said gear being applied to said Geneva motion in less than one-half revolution of said gear to produce the usual pull-down of 24 frames per second, said driving part of said Geneva motion engaging said driven part thereof to impart thereto a movement which is first lessened after engagement and then increased to maximum while said parts are in engagement.

OTTO H. LUTHER.

REFERENCES CITED

The following references are of record in the file of this patent:

UNITED STATES PATENTS

| Number | Name | Date |
| --- | --- | --- |
| 647,529 | Schneider | Apr. 17, 1900 |
| 714,845 | White | Dec. 2, 1902 |
| 1,361,144 | Darby | Dec. 7, 1920 |
| 1,742,001 | Moulton | Dec. 31, 1929 |
| 1,852,419 | Kuchenmeister | Apr. 5, 1932 |
| 1,949,909 | Heckler | Mar. 6, 1934 |
| 1,984,264 | Gualtierotti | Dec. 11, 1934 |
| 2,082,093 | Bedford | June 1, 1937 |
| 2,240,324 | Bert | Apr. 29, 1941 |
| 2,415,390 | Konkle | Feb. 4, 1947 |

FOREIGN PATENTS

| Number | Country | Date |
| --- | --- | --- |
| 323,062 | France | Oct. 27, 1902 |